G. J. ADAM.
ANTISKIDDING DEVICE FOR TIRES.
APPLICATION FILED APR. 25, 1910.
1,014,358.
Patented Jan. 9, 1912.
2 SHEETS—SHEET 1.
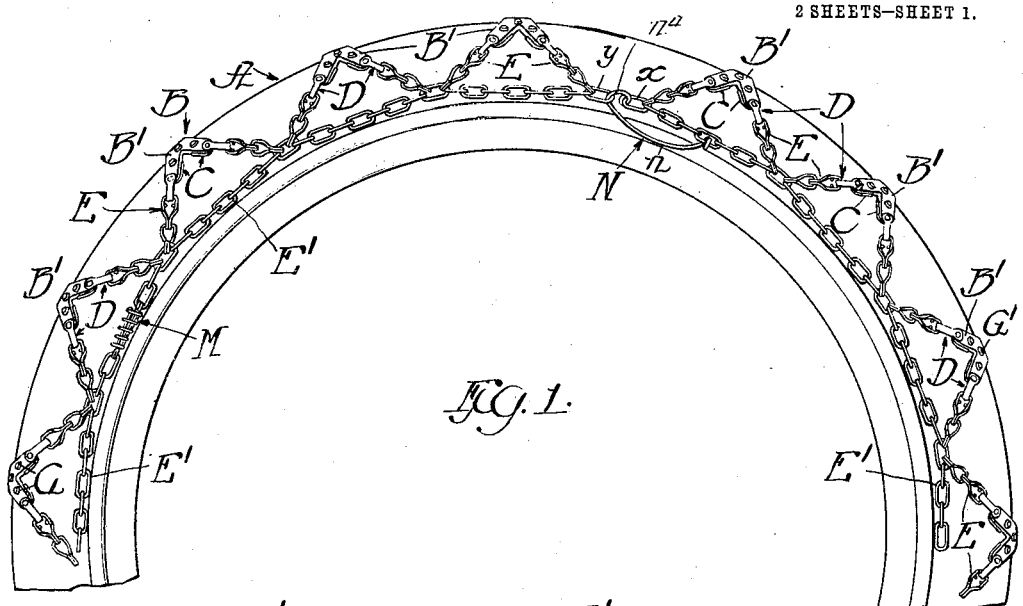
Fig. 1.
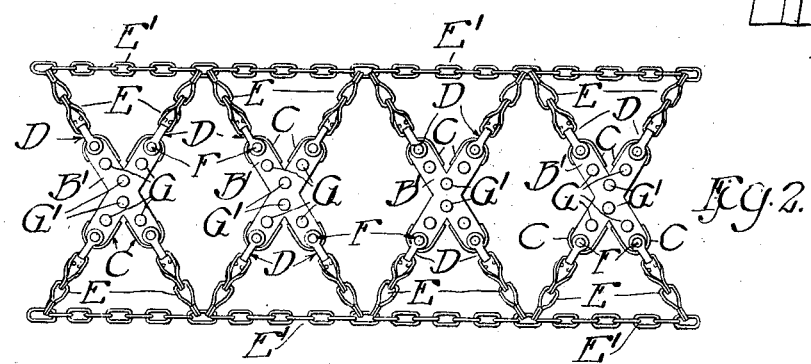
Fig. 2.
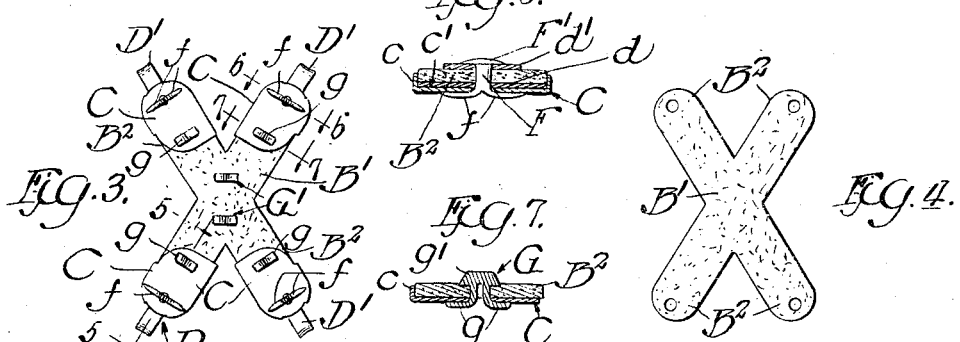
Witnesses:
Inventor
George J. Adam

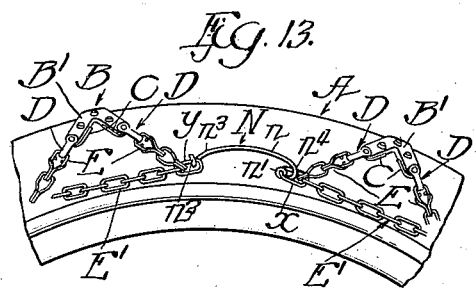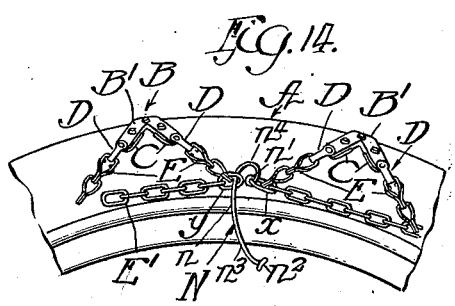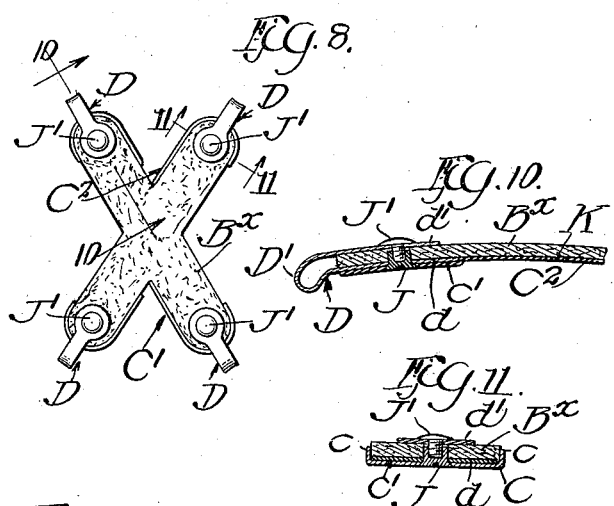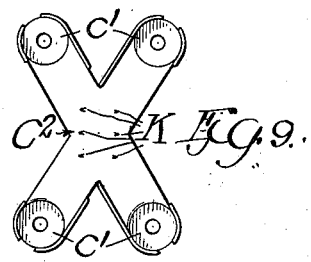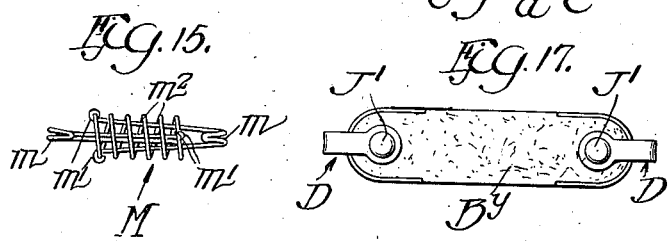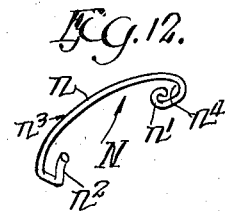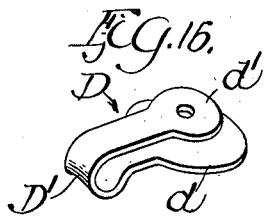

UNITED STATES PATENT OFFICE.

GEORGE J. ADAM, OF CHICAGO, ILLINOIS.

ANTISKIDDING DEVICE FOR TIRES.

1,014,358.   Specification of Letters Patent.   Patented Jan. 9, 1912.

Application filed April 25, 1910. Serial No. 557,329.

*To all whom it may concern:*

Be it known that I, GEORGE J. ADAM, a citizen of the United States, and a resident of Chicago, in the county of Cook and State of Illinois, have invented certain new and useful Improvements in Antiskidding Devices for Tires; and I do hereby declare that the following is a full, clear, and exact description thereof, reference being had to the accompanying drawings, and to the letters of reference marked thereon, which form a part of this specification.

This invention relates to improvements in anti-skidding tread devices for yielding tires, such as pneumatic cushion or soft rubber tires, and particularly to improvements in that type of such devices in which tough, non-metallic, flexible pads, such, for example, as leather pads are provided for inducing friction between the tire and the road. As at present constructed, anti-skidding tread devices provided with such pads are not readily renewable in single parts, as, for example, by substituting a single new pad for an old, worn pad, and the object of my invention is to provide the antifriction tread device with an attaching mechanism for the pad which serves as an efficient means for retaining it in proper position when in use, and also provides a simple and economical means for renewing the pads singly when they have become worn.

The invention consists in the combination of elements hereinafter described and more particularly pointed out in the appended claims.

In the drawings:—Figure 1 is a side elevation of a portion of a tire, showing an anti-skidding device in place thereon provided with my improved pad retaining means. Fig. 2 is a top plan view of the anti-skidding tread device. Fig. 3 is a bottom plan view of one of the pads showing the means by which the pad is attached. Fig. 4 is a top plan view of the pad itself. Fig. 5 is a longitudinal section through one end of the pad and its attaching means on the line 5—5 of Fig. 3. Fig. 6 is a transverse section through Fig. 3 on the line 6—6 thereof. Fig. 7 is a transverse section through Fig. 3 on the line 7—7 thereof. Fig. 8 is a top plan view of a pad provided with a slightly modified form of attaching means. Fig. 9 is a top plan view of the same with the pad removed. Fig. 10 is a partial section through Fig. 8 on the line 10—10 thereof. Fig. 11 is a section through Fig. 10 on the line 11—11 thereof. Fig. 12 is a perspective view of a locking cam lever adapted to draw together and lock the ends of the peripheral chains to which the anti-skidding pads are connected. Figs. 13 and 14 are side elevation of parts of the tire and wheel felly illustrating the different stages in the operation of said cam lever lock. Fig. 15 is an enlarged top plan view of one of the spring connections by which the peripheral chains are connected. Fig. 16 is a perspective view of the clip by means of which the retaining plate is connected to the link members which in turn are connected to the peripheral chains. Fig. 17 is a top plan view of a retaining plate for a modified form of pad.

A indicates a tire and B an anti-skidding device provided with a plurality of pads $B^1$ secured to link members E, which link members are secured at regular intervals to links of peripheral chains $E^1$, two link members of adjacent pads being secured to the same link of said peripheral chain, as indicated in Fig. 1. Said pads $B^1$ are usually made of leather or of any other suitable non-metallic, tough, flexible material which tends to induce friction.

C indicates retaining plates which underlie each end of a pad and serve to retain it in place in the assembled anti-skidding device. The retaining plate is preferably made of sheet metal and is of the general form and dimension of the end $B^2$ of the anti-skidding pad. It is provided about its ends with upturned flanges $c$ against which the end margins of the pad abut when the pad is in position. Said flanges take up the thrust of the pad when its frictional engagement with the road tends to displace or dislodge it and also serve another purpose which will presently appear.

D represents a clip (Figs. 5 and 16) for attaching the retaining plate to the link members E and by means of which the retaining plate is secured in the assembled anti-skidding device. Said clip is formed from a sheet of thin metal bent upon itself and provided at its lower side with an anchor plate $d$ and on its upper side with a washer extension $d^1$. The anchor plate $d$ is preferably circular in form and rests in a similarly formed depression $c^1$ in the outer end of the retaining plate and abuts with its edges against the upturned flanges $c$.

The two members of the clip embrace the end of the pad, one lying below it and the other above it and the clip is secured in place by means of a split rivet F which has a flat head F¹ to engage the washer d¹, and has its split ends f spread apart to lie against the underside of the retaining plate C. The folded end of the clip is formed, as indicated at D¹, to retain a link of a chain while at the same time permitting the link to be snapped into position. It is apparent that by the construction of the anchor plates d of the clip D and its engagement with the upturned flanges c, a strong connection is made between the link member E and the retaining plate, and little or no strain is exerted on the bolt or rivet by means of which the pad is secured to the plate. The inner ends of the plates are secured to the pad by rivets G (Figs. 5 and 7) which have split shanks g adapted to be spread apart against the underside of the retaining plate. Said rivets have heads in the form of studs g which tend to protect the pad without interfering with the anti-skid character of the pad; preferably several of said rivets are secured to the body of the pad, as indicated at G¹.

When it is desired to remove a pad and replace it by a fresh one the anti-skidding device is removed from the tire, or loosened so that the underside of the pad to be removed may be gotten at, the rivets F are removed and the worn pad, including its retaining plates, is detached from the clips D. A new pad with retaining plates held in position on its ends by the rivets G is then applied to the clips, with the washers d¹ and the anchor plates d embracing its ends, and the anchor plate in the depression c¹.

The outer end of the retaining plate C is depressed as indicated at c¹ a depth equal in thickness to the anchor plate d of the clip in order to provide a continuous smooth surface for the ends of the pad B¹. Such depressions are not essential but they are preferable in order that the underside of the pad may not be unnecessarily worn at this point.

In Figs. 8 to 11, inclusive, I have shown a modification of my invention, in which the retaining plates instead of being formed simply to underlie the ends of the pad, are connected together by a central web so as to form a single plate underlying the entire pad. In said figures C¹ indicates the retaining plates and C² the central connecting web which underlies the main body of the pad B×. The construction is otherwise the same as that above described except that in this case there is no necessity for the rivets G. I have also shown, in Figs. 10 and 11, another device for locking the clip which comprises a small bolt J inserted from the underside of the retaining plate and provided at its upper end with an internally screw-threaded recess to receive a capped screw J¹.

The retaining plates may be used with pads of any shape. For example, the pad shown in Fig. 17 is a straight pad, while in the other figures of the drawings the pads shown are X-shaped. In case a web connecting the several retaining plates for a pad is used, said web is made to conform to the shape of the pad.

At several points in the periphery of the anti-skidding device are located elastic links of any convenient type, as, for example, that indicated at M in Figs. 1 and 15. Said link comprises oppositely disposed hook members m, m, arranged in longitudinally movable relation to each other and provided with opposing shoulders m¹, m¹, between which engages a coiled spring m². Said spring yieldingly resists any elongation of the member. The spring links give enough elasticity to the peripheral chains E¹ to permit the attachment of the anti-skidding device to the tire without danger of the chain being loose thereon.

In order that there may be a nice fit the ends of the chains E¹ must just meet, and it requires considerable force to draw said ends together. The cam lever N shown in Figs. 1, 12, 13 and 14, is for the purpose of drawing the loose ends of the chain together and for locking them in that position. It is preferably made of heavy wire so as to have the necessary rigidity and consists of a curved member n which may be called a cam member; an eye n¹ by means of which it is attached to an end link of the chain, and which is located at one end of the cam member; and a locking member n² located at the opposite end of said cam member. The locking member is in the form of a hook in a plane at an angle, preferably a right angle, to the plane of the members n and n¹. The cam member n comprises a main long curve n³ and a short sharp curve n⁴.

The operation of the device is as follows: The eye n¹ is connected to a link x at one of the loose ends of the chain and the hook n² is inserted through a link y at the other end of the chain; it being necessary to draw these two links together. The hook n² is then pulled downward and toward the link attached to the eye n¹, the long curve n³ facilitating this movement and permitting the cam member n to slip through the link y until the ends of the chain are drawn into the position indicated in Fig. 14. The device is then moved into the position indicated in Fig. 1, in which the link y has come to rest in the sharp bend n⁴ of the cam member in line with the link x in the eye n¹. The hook n² is attached to one of the links of the chain, as indicated in Fig. 1 which locks the device in place. When removing the anti-skidding device the operation is reversed.

I prefer to provide frictional engagement of the underside of the pad with the plate C² and to this end short prongs or spurs are chipped out and raised from the surface of the plate and turned upward to engage the under face of the pad, as indicated at K. (See Fig. 9). Said prongs are made just long enough to prick into the underside of the pad to prevent it from sliding on the upper face of the retaining plate at points intermediate of its ends. In the case of very thin metal forming the plates, the chipping of the surface extends clear through the plate and amounts to a cut, or the prongs or spurs may be formed in any other convenient manner.

I claim as my invention:—

1. In an anti-skidding device provided with tough, non-metallic, flexible, friction-inducing pads, a retaining plate adapted to underlie the end of a pad, said retaining plate being provided with upturned flanges extending about one end adapted to engage the edges of the pad, and means for attaching the pad to the retaining plate.

2. In an anti-skidding device provided with tough, non-metallic, flexible, friction-inducing pads, a retaining plate adapted to underlie the end of a pad, said retaining plate being provided with upturned flanges extending about one end adapted to engage the edges of the pad, anchoring means for the retaining plate comprising a clip having upper and lower extensions adapted to embrace, respectively, the top and bottom of the end of the pad, the lower extension lying upon the upper face of the retaining plate, and means for securing said clip in place.

3. In an anti-skidding device provided with tough, non-metallic, flexible, friction-inducing pads, a retaining plate adapted to underlie the end of a pad, said retaining plate being provided with upturned flanges extending about one end adapted to engage the edges of the pad, a clip provided with an anchor plate overlying the retaining plate and adapted to engage the underside of the end of the pad and to abut at its edges against said upturned flanges, a washer formed on said clip adapted to overlie the end of the pad, and means for removably securing said clip, pad and plate together.

4. In an anti-skidding device provided with tough, non-metallic flexible, friction-inducing pads, a retaining plate adapted to underlie and support the end of a pad, said retaining plate being provided with upturned flanges extending about one end and adapted to engage the edges of the pad adjacent its end and having a depression formed at said end, a clip provided with a projecting anchor plate adapted to lie within the depression formed in the end of the retaining plate and to abut at its edges against the upturned flanges formed on said retaining plate, a washer formed on said clip adapted to overlie the end of said pad, and means for removably securing the ends of said clip, pad and retaining plate together.

5. In an anti-skidding device provided with tough, non-metallic, flexible, friction-inducing pads, a retaining plate adapted to underlie and support the end of a pad, a clip provided with an anchor plate overlying the end of the retaining plate and adapted to engage the underside of the end of the pad, a washer formed on said clip adapted to overlie the end of the pad, and means for removably securing said clip, pad and plate together.

6. In an anti-skidding device provided with tough, non-metallic, flexible, friction-inducing pads, a retaining plate adapted to underlie and support a pad, said retaining plate having a depression formed at one end, a clip provided with a projecting anchor plate adapted to lie within the depression formed in the end of the retaining plate, a washer formed on said clip adapted to overlie the end of said pad, and means for removably securing the end of said clip, pad and retaining plate together.

7. In an anti-skidding device provided with tough, non-metallic, flexible, friction-inducing pads, a retaining plate adapted to underlie and support the end of a pad, a clip provided with an anchor plate overlying the end of the retaining plate and adapted to engage the underside of the end of the pad, a washer formed on said clip adapted to overlie the end of the pad, a rivet extending through said washer, pad, anchor plate and retaining plate adapted to removably secure said parts together, and supplemental means adapted to secure the inner part of said retaining plate to said pad.

8. In an anti-skidding device provided with tough, non-metallic, flexible, friction-inducing pads, a set of retaining plates for each pad adapted to underlie and support the ends of the pad, a central web or plate connecting said retaining plates and underlying the main body of the pad, said central plate having short upward prongs formed on its upper surfaces near its middle adapted to engage the under surface of the pad, clips provided with anchor plates overlying the outer ends of the retaining plates and adapted to engage the underside of the ends of the pad, washers formed on said clips adapted to overlie the ends of the pad, and means for removably securing said clips, the ends of the pad and the retaining plates together.

9. In an anti-skidding device provided with tough, non-metallic, flexible, friction-inducing pads, a set of retaining plates for each pad including a retaining plate for each end of said pads, each retaining plate being adapted to underlie and support the end of the pad, a set of clips one for each retaining plate, each clip being provided with an anchor plate overlying the end of the retaining plate and being adapted to engage the underside of the end of the pad, and with a washer formed on said clip adapted to overlie the end of the pad, means for removably securing each clip and end of the pad, and the retaining plate together, and supplemental means for securing the inner part of the plate to the pad.

10. In an anti-skidding device provided with tough, non-metallic, flexible, friction-inducing pads, a set of retaining plates for each pad including a retaining plate for each end of said pads, each retaining plate being adapted to underlie and support the end of the pad, a set of clips, one for each retaining plate, each clip being provided with an anchor plate overlying the end of the retaining plate and being adapted to engage the underside of the end of the pad, and with a washer formed on said clip adapted to overlie the end of the pad, means for removably securing each clip and end of the pad, and the retaining plate together, and a central plate or web underlying the body of the pad and connecting said retaining plates.

In testimony, that I, claim the foregoing as my invention I affix my signature in the presence of two witnesses, this 15th day of April A. D. 1910.

GEORGE J. ADAM.

Witnesses:
 GEORGE R. WILKINS,
 T. H. ALFREDS.